US 6,600,914 B2

(12) United States Patent
Uhlik et al.

(10) Patent No.: US 6,600,914 B2
(45) Date of Patent: *Jul. 29, 2003

(54) SYSTEM AND METHOD FOR EMERGENCY CALL CHANNEL ALLOCATION

(75) Inventors: Christopher R. Uhlik, Danville, CA (US); Mitchell D. Trott, Mountain View, CA (US); Lawrence J. Alder, Mountain View, CA (US)

(73) Assignee: ArrayComm, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/317,802

(22) Filed: May 24, 1999

(65) Prior Publication Data

US 2002/0065063 A1 May 30, 2002

(51) Int. Cl.[7] .................................................. H04B 1/00
(52) U.S. Cl. ........................ 455/404; 455/512; 455/452
(58) Field of Search ................................ 455/404, 450, 455/451, 452, 455, 464, 414, 512

(56) References Cited

U.S. PATENT DOCUMENTS

| 3,704,465 A | 11/1972 | Masak et al. |
| 3,774,209 A | 11/1973 | Fleming et al. |
| 3,798,645 A | 3/1974 | Baurle et al. |
| 3,852,749 A | 12/1974 | Kohler |
| 3,946,385 A | 3/1976 | Ewen |
| 4,005,379 A | 1/1977 | Lerner |
| 4,035,746 A | 7/1977 | Covington, Jr. |
| 4,085,319 A | 4/1978 | Deitz et al. |
| 4,128,740 A | 12/1978 | Graziano |
| 4,263,568 A | 4/1981 | Nemit |
| 4,316,191 A | 2/1982 | Sawatari et al. |

(List continued on next page.)

FOREIGN PATENT DOCUMENTS

| EP | 0 639 035 A1 | 2/1995 |
| EP | 0 665 665 A1 | 8/1995 |
| EP | 0 713 261 A1 | 5/1996 |
| EP | 0729285 A2 | 8/1996 |
| EP | 0 777 400 A2 | 6/1997 |

(List continued on next page.)

OTHER PUBLICATIONS

Ottersten, B., "Array Processing for Wireless Communications," Proc. 8th IEEE Signal Processing Workshop on Statistical Signal and ArrayProcessing, Jun. 1996, pp. 466–473.

Farsakh et al., "A Real Time Downlink Channel Allocation Scheme for an SDMA Mobile Radio System," IEEE International Symposium on Personal, Indoor and Mobile Radio Communications, vol. 3, Oct. 18, 1996, pp. 1215–1220.

(List continued on next page.)

Primary Examiner—Thanh Cong Le
Assistant Examiner—Nick Corsano
(74) Attorney, Agent, or Firm—Dov Rosenfeld; Inventek

(57) ABSTRACT

An emergency call recognition system which is activated when an off-hook situation occurs, which recognizes when an emergency number is dialed with or without the presence of a dial tone, and which provides the caller a communication channel to complete such a call. The present invention is used to give priority to emergency telephone calls. Typically the present invention is used in wireless local loop systems, however the present invention can also be incorporated into a conventional telephone system. The present invention uses an emergency call recognition system to determine if a person is dialing an emergency telephone number. If the emergency call recognition system recognizes a dialed telephone number as an emergency telephone number, then the caller is provided with a communication channel to complete the telephone call. The caller is provided a communication channel even if all of the communication channels are in use. This is accomplished by disconnecting calls that are not of an emergency nature.

57 Claims, 6 Drawing Sheets

U.S. PATENT DOCUMENTS

| | | |
|---|---|---|
| 4,375,622 A | 3/1983 | Hollingsworth et al. |
| 4,434,505 A | 2/1984 | Gutleber |
| 4,475,010 A | 10/1984 | Huensch et al. |
| 4,626,859 A | 12/1986 | Stansfield |
| 4,639,732 A | 1/1987 | Acoraci et al. |
| 4,639,914 A | 1/1987 | Winters |
| 4,658,096 A | 4/1987 | West, Jr. et al. |
| 4,737,794 A | 4/1988 | Jones |
| 4,737,975 A | 4/1988 | Shafer |
| 4,742,356 A | 5/1988 | Kuipers |
| 4,750,147 A | 6/1988 | Roy, III et al. |
| 4,775,997 A | 10/1988 | West, Jr. et al. |
| 4,796,291 A | 1/1989 | Makino |
| 4,827,395 A | 5/1989 | Anders et al. |
| 4,829,554 A | 5/1989 | Barnes et al. |
| 4,837,800 A | 6/1989 | Freeburg et al. |
| 4,855,748 A | 8/1989 | Brandao et al. |
| 4,910,794 A | 3/1990 | Mahany |
| 4,922,517 A | 5/1990 | West, Jr. et al. |
| 4,926,186 A | 5/1990 | Kelly et al. |
| 4,940,963 A | 7/1990 | Gutman et al. |
| 4,947,452 A | 8/1990 | Hattori et al. |
| 4,955,082 A | 9/1990 | Hattori et al. |
| 4,965,732 A | 10/1990 | Roy, III et al. |
| 4,965,849 A | 10/1990 | Kunihiro |
| 4,965,850 A | 10/1990 | Schloemer |
| 4,972,151 A | 11/1990 | Rosen |
| 4,989,204 A | 1/1991 | Shimizu et al. |
| 5,041,833 A | 8/1991 | Weinberg |
| 5,052,799 A | 10/1991 | Sasser et al. |
| 5,093,924 A | 3/1992 | Toshiyuki et al. |
| 5,103,459 A | 4/1992 | Gilhousen et al. |
| 5,109,535 A | 4/1992 | Kume et al. |
| 5,124,697 A | 6/1992 | Moore |
| 5,142,253 A | 8/1992 | Mallavarpu et al. |
| 5,159,593 A | 10/1992 | D'Amico et al. |
| 5,255,210 A | 10/1993 | Gardner et al. |
| 5,260,968 A | 11/1993 | Gardner et al. |
| 5,262,789 A | 11/1993 | Silverstein |
| 5,274,844 A | 12/1993 | Harrison et al. |
| 5,276,907 A | 1/1994 | Meidan |
| 5,283,540 A | 2/1994 | Myer |
| 5,299,148 A | 3/1994 | Gardner et al. |
| 5,335,249 A | 8/1994 | Krueger et al. |
| 5,345,596 A | 9/1994 | Buchenhorner et al. |
| 5,361,303 A | 11/1994 | Eatwell |
| 5,367,559 A | 11/1994 | Kay et al. |
| 5,379,320 A | 1/1995 | Fernandes et al. |
| 5,387,915 A | 2/1995 | Moussa et al. |
| 5,423,072 A | 6/1995 | Iwashita et al. |
| 5,430,760 A | 7/1995 | Dent |
| 5,440,281 A | 8/1995 | Wey et al. |
| 5,448,621 A | 9/1995 | Knudsen |
| 5,457,812 A | 10/1995 | Siira et al. |
| 5,465,399 A | 11/1995 | Oberholtzer et al. |
| 5,471,647 A | 11/1995 | Gerlach et al. |
| 5,475,864 A | 12/1995 | Hamabe |
| 5,475,868 A | 12/1995 | Duque-Anton et al. |
| 5,497,505 A | 3/1996 | Koohgoli et al. |
| 5,515,378 A | 5/1996 | Roy, III et al. |
| 5,530,449 A | 6/1996 | Wachs et al. |
| 5,530,917 A | 6/1996 | Andersson et al. |
| 5,532,706 A | 7/1996 | Reinhardt et al. |
| 5,537,438 A | 7/1996 | Mourot et al. |
| 5,543,801 A | 8/1996 | Shawyer |
| 5,546,090 A | 8/1996 | Roy, III et al. |
| 5,548,813 A | 8/1996 | Charas et al. |
| 5,553,074 A | 9/1996 | Acampora |
| 5,555,445 A | 9/1996 | Booth |
| 5,557,657 A | 9/1996 | Barnett |
| 5,565,873 A | 10/1996 | Dean |
| 5,566,209 A | 10/1996 | Forssen et al. |
| 5,574,977 A | * 11/1996 | Joseph ............... 455/58.1 |
| 5,576,717 A | 11/1996 | Searle et al. |
| 5,592,490 A | 1/1997 | Barratt et al. |
| 5,596,625 A | * 1/1997 | LeBlanc ............... 379/60 |
| 5,603,082 A | 2/1997 | Hamabe |
| 5,603,089 A | 2/1997 | Searle et al. |
| 5,606,729 A | 2/1997 | D'Amico et al. |
| 5,615,409 A | 3/1997 | Forssen et al. |
| 5,621,752 A | 4/1997 | Antonio et al. |
| 5,625,885 A | 4/1997 | Nakazawa et al. |
| 5,638,375 A | 6/1997 | Dettro et al. |
| 5,649,287 A | 7/1997 | Forssen et al. |
| 5,673,291 A | 9/1997 | Dent |
| 5,675,581 A | 10/1997 | Soliman |
| 5,678,188 A | * 10/1997 | Hisamura ............... 455/34.1 |
| 5,684,836 A | 11/1997 | Nagayasu et al. |
| 5,689,219 A | 11/1997 | Piirainen |
| 5,689,502 A | 11/1997 | Scott |
| 5,694,416 A | 12/1997 | Johnson |
| 5,697,066 A | 12/1997 | Acampora |
| 5,726,978 A | 3/1998 | Frodigh et al. |
| 5,732,076 A | 3/1998 | Ketseoglou et al. |
| 5,742,904 A | * 4/1998 | Pinder ............... 455/404 |
| 5,745,858 A | 4/1998 | Sato et al. |
| 5,748,676 A | 5/1998 | Mahany |
| 5,752,165 A | 5/1998 | Hokkanen |
| 5,774,461 A | 6/1998 | Hyden et al. |
| 5,809,009 A | 9/1998 | Matsuoka et al. |
| 5,809,019 A | 9/1998 | Ichihara et al. |
| 5,812,090 A | 9/1998 | Chevalier et al. |
| 5,818,918 A | * 10/1998 | Fujii ............... 379/167 |
| 5,819,182 A | 10/1998 | Gardner et al. |
| 5,825,762 A | 10/1998 | Kamin, Jr. et al. |
| 5,828,658 A | 10/1998 | Ottersten et al. |
| 5,845,212 A | 12/1998 | Tanaka |
| 5,862,485 A | * 1/1999 | Linneweh ............... 455/450 |
| 5,884,148 A | * 3/1999 | Bilgic ............... 455/74.1 |
| 5,887,038 A | 3/1999 | Golden |
| 5,905,721 A | 5/1999 | Liu et al. |
| 5,909,470 A | 6/1999 | Barratt et al. |
| 5,914,946 A | 6/1999 | Avidor et al. |
| 5,930,243 A | 7/1999 | Parish et al. |
| 5,933,421 A | 8/1999 | Alamouti et al. |
| 5,937,355 A | * 8/1999 | Joong ............... 455/466 |
| 5,955,992 A | 9/1999 | Shattil |
| 5,970,394 A | 10/1999 | Arpee et al. |
| 5,973,638 A | 10/1999 | Robbins et al. |
| 5,999,826 A | 12/1999 | Whinnett |
| 6,005,854 A | 12/1999 | Xu et al. |
| 6,009,124 A | 12/1999 | Smith et al. |
| 6,018,317 A | 1/2000 | Dogan et al. |
| 6,018,555 A | 1/2000 | Mahany |
| 6,018,643 A | 1/2000 | Golemon et al. |
| 6,023,203 A | 2/2000 | Parish |
| 6,061,553 A | 5/2000 | Matsuoka et al. |
| 6,064,865 A | 5/2000 | Kuo et al. |
| 6,067,324 A | 5/2000 | Harrison |
| 6,108,323 A | * 8/2000 | Gray ............... 370/335 |
| 6,108,565 A | 8/2000 | Scherzer |
| 6,131,016 A | 10/2000 | Greenstein et al. |
| 6,154,661 A | 11/2000 | Goldburg |
| 6,185,412 B1 | * 2/2001 | Pentikainen ............... 455/404 |
| 6,208,865 B1 | * 3/2001 | Veerasamy ............... 455/450 |
| 6,292,664 B1 | * 9/2001 | Ostrup ............... 455/453 |

FOREIGN PATENT DOCUMENTS

| | | |
|---|---|---|
| EP | 0786914 A2 | 7/1997 |
| GB | 2 237 706 A | 5/1991 |
| GB | 2 295 524 A | 5/1996 |

| | | |
|---|---|---|
| GB | 2 313 261 A | 11/1997 |
| JP | 7-170548 | 4/1995 |
| WO | 95/34103 | 12/1995 |
| WO | WO96/22662 | 7/1996 |
| WO | WO 97/08849 | 3/1997 |
| WO | 98/01963 | 1/1998 |
| WO | 98/17037 | 4/1998 |
| WO | 98/17071 | 4/1998 |
| WO | 98/28864 | 7/1998 |
| WO | 98/33346 | 7/1998 |

OTHER PUBLICATIONS

Franks, "Synchronization Subsystems: Analysis and Design", 1981, Digital Communications Satellite/Earth Station Engineering, pp. 294–335.

Friedlander, "Direction Finding Using an Interpolated Array", Apr. 3, 1990, International Conference on Acoustics, Speech, and Signal Processing, vol. 5, pp. 2951–2954.

Friedlander et al., "Direction Finding for Wideband Signals Using an Interpolated Array", 1991, IEEE Publication, pp. 583–587.

Ganz et al., "A Data–Derived Reference Signal Technique for Adaptive Arrays", IEEE Transactions on Communications, vol. 37, No. 9, Sep. 1989, pp. 975–983.

Iltis et al., "A Digital DS Spread–Spectrum Receiver With Joint Channel and Doppler Shift Esitmation", IEEE Transactions on Communications, vol. 39, No. 8, Aug. 1991, pp. 1255–1267.

Krishnamurthy et al., "Polling Based Media Access Protocols For Use With Smart Adaptive Array Antennas", 1998 IEEE, pp. 337–344.

Lee et al., "Decision Directed Carrier Recovery—Chapter 16: Carrier Recovery", 1994 Digital Communications, 2nd Edition, Kluwer Academic Pub., pp. 725–736.

Lee et al., "Decision Directed Carrier Recovery—Chapter 17: Timing Recovery", 1994 Digital Communications, 2nd Edition, Kluwer Academic Pub., pp. 737–764.

Lundell et al., "Applications of the Constant Modulus Adaptive Beamformer to Constant and Non–Constant Modulus Signals", Proceedings, 1998 Asilomar Conference on Signals, Systems, and Computers (ACSSC–1988), pp. 432–436.

Muhamed et al., "Direction of Arrival Estimation Using Antenna Arrays", 1996, The Bradley Dept. of Electrical Enginerring, Mobile and Portable Radio Research Group, Section 3.8, pp. 64–71.

vander Veen et al., "A Constant Modulus Factorization Technique for Smart Antenna Applications in Mobile Communications", SPIE 1994 "Advanced Signal Processing Algorithms, Architectures, and Implementations V", vol. 2296, pp. 230–241.

Talwar et al., "Recursive Algorithms for Estimating Multiple Co–Channel Digital Signals Received at an Antenna Array", Proc. Fifth Annual IEEE Dual Use Technologies and Applications Conference.

Papadias et al., "A Space–Time Constant Modulus Algorithm for SDMA Systems", 1996, Proceedings, IEEE 46th Vehicular Technology Conference, pp. 86–90.

Talwar et al., "Blind Estimation of Multiple Co–Channel Digital Signals Arriving at an Antenna Array", 1993, Proc. 27th Asilomar Conference on Signals, Systems, and Computers, vol. 1, pp 349–342.

Rashid–Farrokhi et al., "Joint Power Control and Beamforming for Capacity Improvement in Wireless Networks With Antenna Array", 1996 IEEE GLOBECOM 1996, vol. 1. pp. 555–559.

Rashid–Farrokhi et al., "Transmit Beamforming for Cellular Communication Systems", Conference on Information Sciences and Systems, CISS–97; Mar. 1997, 4 pages.

Rashid–Farrokhi et al., "Downlink and Uplink Capacity Enhancement in Power Controlled Cellular Systems", Proceedings, 1997 IEEE 47th Vehicular Technology Conference, vol. 2 May 1997, pp. 647–651.

Rashid–Farrokhi et al., "Downlink Power Control and Base Station Assignment", IEEE Communications Letters, vol. 1, No. 4, Jul. 1997, pp. 102–104.

Rashid–Farrokhi et al., "Transmit Diversity and Equalization for Power Controlled Wireless Networks", Conference Record 31st Asilomar Conference on Signals, Systems, and Computers, vol. 1, Nov. 1997, pp. 620–624.

Xu et al., "Throughput Multiplication of Wireless LANs for Multimedia Services: SDMA Protocol Design", 1994, IEEE, pp. 1326–1332.

Swidlehurst et al., "Analysis of a Decision Directed Beamformer", IEEE Transactions on Signal Processing, vol. 43, No. 12, Dec. 1995, pp. 2920–2927.

Zhang et al., "Performance of a Modified Polling Strategy for Broadband Wireless LANs in a Harsh Fading Environment", 1991, GLOBECOM 1991, pp. 1141–1146.

US98/25364, PCT Search Report, May 11, 1999.

Christof Farsakh et al., Channel Allocation and Downlink Beamforming in an SDMA Mobile Radio System, 1995 IEEE, pp. 687–691.

Derek Gerlach et al., Base Station Transmitter Antenna with Mobile to Base Feedback, 1993 IEEE, pp. 1432–1436, http://www.stanford.edu/~apaulraj/paulraj_publist.html.

Acampora et al., "A New Adaptive MAC Layer Protocol for Wireless ATM Networks in Harsh Fading and Interference Environments", 1997 IEEE, pp. 410–415.

Agee, "Blind Separation and Capture of Communication Signals Using A Multitarget Constant Modulus Beamformer", Oct. 7, 1989 Proc. IEEE Military Communications Conference, vol. 2, pp. 1–12.

Aschied et al., "An All Digital Receiver Architecture for Bandwidth Efficient Transmission at High Data Rates", 1989, IEEE Transactions on Communications, vol. 37, No. 8, pp. 804–813.

* cited by examiner

SYSTEM AND METHOD FOR EMERGENCY CALL CHANNEL ALLOCATION

FIELD OF THE INVENTION

The present invention relates to a wireless communication system. More particularly, the present invention relates to an emergency call system which improves the grade of service (GOS) of a wireless communication system that has reached its maximum call capacity.

BACKGROUND

Wireless local loop systems are used in remote locations which typically have electricity but do not have telephone service. Instead of spending money on providing a wireline telephone service, it is typically easier to use a wireless local loop system. The wireless local loop system allows a user to operate a telephone at a remote site. The typical wireless local loop system includes at least one telephone device which is connected to an interface which in turn is connected to a radio telephone transceiver (either cellular or other wireless systems). The combination of the telephone device or devices and the remote radio telephone transceiver is referred to as the "subscriber unit."

In a wireless local loop system, the link from the subscriber unit to the telephone system, for example, the local-exchange switch, is provided at least partially by a wireless communication channel. For example in a cellular wireless local loop (WLL) system, each subscriber unit is in a fixed location and communicates with a cellular radio base station responsible for all subscriber units within a cell. Sets of subscriber units communicate with one or more base stations which in turn are connected to the rest of the telephone network, typically a local exchange switch or other voice switching communications network router.

A caller cannot place a call in a wireless local loop system without a communication link existing between the subscriber unit and telephone system, including a wireless communication channel between the subscriber unit and the base station. In a typical wireless local loop system, there are usually more subscriber units than available wireless communication channels for audio links. Therefore in an emergency situation, a caller might not be able to make an emergency call because there are no wireless communication channels available.

In wireless telephone systems, the failure to obtain an open communication channel to place a telephone call is an "accepted evil." However if someone is trying to place an emergency call, this accepted evil can be fatal. In an emergency, it is imperative that a caller be able to dial an emergency telephone number. An emergency telephone number can be "911" or the telephone number for the police, ambulance, fire department, poison control, or another known emergency telephone number.

A wireless local loop system subscriber unit may have a locally generated dial tone to simulate the "look and feel" of a conventional wireline telephone device when the handset is taken "off hook." Alternatively, detecting an off hook condition on the telephone device of the subscriber unit may lead to a channel assignment request being made to a base station. Once a wireless channel is assigned, this being a channel for an audio link, a dial tone is generated by the switch and transmitted to the subscriber unit as in conventional wireline systems. The embodiments of the present invention are more suitable to this second case but may be used in both cases. The embodiments of the present invention also are suitable for use in a regular cellular system wherein the subscriber units are not necessarily fixed in location and may not necessarily be attached to a "plain old telephone set" (POTS).

In a wireless local loop system in which a dial tone is not generated until an audio-grade communication channel is assigned from the subscriber unit to the local switch, three things must occur in order to allow a caller to dial an emergency number without the presence of a dial tone: 1) the caller must be able to dial a telephone number, even without requiring a switch-generated dial tone or indeed any dial tone to be present, 2) the telephone number dialed must be recognized in some manner as an emergency call, and 3) the call must be placed if indeed it is recognized as an emergency call. Present day wireless telephone systems, whether wired or not, do not allow a call to be placed in this manner.

Therefore there is a need for a telephone system which activates an emergency call recognition system, recognizes when an emergency number is dialed and provides a communication channel for the caller to complete such a call even at maximum capacity. Such a system also would cut off or otherwise compromise the service quality of those calls that are not emergency calls when the system is operating at such maximum capacity.

SUMMARY

One feature of the present invention is allowing for the placement (by dialing) of emergency telephone calls in a wireless system operating at capacity.

Another feature of the present invention is providing a communication channel to a caller who is placing such an emergency call in a wireless system.

Another feature of the present invention is using an emergency call recognition system which compares the dialed number (a sequence of digits) to one or more predefined digit sequences defined as emergency telephone numbers in a wireless system.

Yet another feature of the present invention is recognizing if an emergency telephone number has been dialed without requiring a dial tone in a wireless system.

Yet another feature of the present invention is providing an indicator to a caller if all of the communication channels are in use in a wireless system.

One aspect of the present invention is an emergency call recognition system which is part of a wireless system and which recognizes when a dialed number is an emergency number is dialed and which provides a wireless communication channel to the caller to complete the call when the call is determined to be an emergency call. Thus, the present invention allows emergency calls to be made at any time by ensuring allocation of a communication channel for this purpose.

In a first embodiment of the present invention, a certain number of wireless channels of the totality of communication channels licensed to a wireless system are reserved for the purpose of determining at the base station if a set of dialed digits is an emergency call when all the non-reserved channels are busy. While this reduces to some extent the maximum capacity of the system for non-emergency calls, the grade of service (GOS) for emergency calls is dramatically improved.

In a second embodiment of the channel allocation of the present invention, a number of low-bit-rate wireless communication channels is reserved for the purpose of recognizing at the base station when an emergency call is being made when all full-rate channels are busy. These low-bit-rate channels typically are not sufficient for an audio communication, for example, for voice or a facsimile. The recognition preferably is digit by digit. After emergency number determination, via a priority recognition system, the emergency call is given a full-rate (e.g., audio-grade) wireless communication channel by cutting off an existing full rate non-emergency telephone call or downgrading the bit rate of one or more non-emergency telephone calls.

In a third embodiment of the channel allocation of the present invention, the subscriber unit recognizes an emergency telephone number, preferably digit by digit. Thereafter the subscriber unit sends an emergency link request to the base station. If there are no available channels, the base station assigns a channel by disconnecting or otherwise downgrading an existing telephone call that is not an emergency call or degrading the bit rate of existing non-emergency calls, providing the freed channel to the emergency caller.

As defined herein, an emergency call is defined as a sequence of digits of a set of pre-defined emergency digit sequences (e.g., 911). Any user who dials a pre-configured emergency number using either DTMF or pulse dialing will have an improved chance of seizing a channel on a congested system. Emergency numbers can then be detected in the base station of the wireless local loop or, in another embodiment, in the subscriber unit of the present invention, for example, before channel allocation. In the preferred embodiment, emergency numbers are detected on a digit by digit basis to rapidly determine if the sequence is not an emergency number, such determining being possible before all the numbers have been dialed, thereby speeding up the determination of which telephone calls are not emergency numbers.

DETAILED DESCRIPTION OF THE PREFERRED EMBODIMENT

Figure 1A:
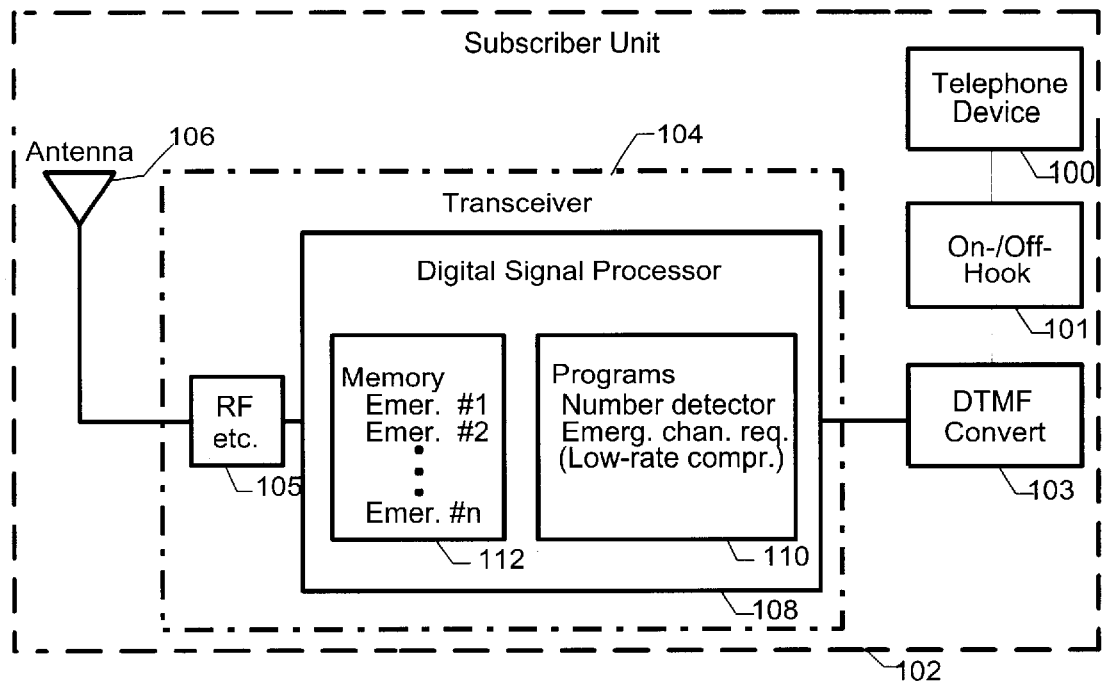
FIG. 1A illustrates an overview of a subscriber unit on which a preferred embodiment of the present invention is implemented;.

One aspect of the present invention is a system and method for emergency call channel allocation in a wireless system. The technology of the present invention allows emergency calls to be placed by a user in distress (or is otherwise a priority user) even when the wireless system is operating at capacity, that is, all wireless communication channels are in use. The various embodiments of the present invention are described in detail below. They share certain common characteristics however such as:

1. Sequence recognition of emergency numbers, preferably digit-by-digit and
2. Methodology that insures that a wireless communication channel is assigned to a caller once an emergency number sequence is recognized.

In all embodiments, a wireless local loop system having a limited number of communication channels is addressed. In a wireless local loop system, the subscriber unit establishes two way communications with a base station which in turn is linked to a master cellular-type switching center which is in turn is linked with a local telephone central switching office (the switch). A base station transceiver establishes a link with a subscriber unit transceiver by assigning a wireless communication channel between the base station and the subscriber unit. Note that the terms base station and communication station are used interchangeably herein.

In the preferred embodiment, the base station transceiver uses an array of antenna elements together with spatial processing to communicate with the subscriber unit. Such spatial processing clearly is not a necessary part of the invention. During reception, the spatial processing acts on the signals received at the antenna array and in particular transforms the antenna signals into a received signal from a particular subscriber unit. During transmission, the spatial processing transforms a to-be-transmitted signal into antenna signals to be transmitted at the antenna array elements to the subscriber unit. The spatial processing, preferably linear spatial processing is adaptively determined. Such systems are sometimes called "smart antenna" wireless communication systems. Such spatial processing of the antenna signals potentially provides several signal quality advantages, including increased cell-phone capacity in each cell. In some cases, smart antenna systems enable simultaneous communications over the same "conventional communication channel." This is sometimes called spatial division multiple access (SDMA). A conventional communication channel is a frequency, time, or code communication channel or a combination of these. For a description of spatial processing See U.S. Pat. No. 5,592,490 to Barratt et al., incorporated herein by reference. While smart antenna systems with spatial processing allow for SDMA, that is, more than one "spatial communication channel" per conventional communication channel, many of the advantages of spatial processing are still available even with one spatial communication channel per conventional communication channel.

The present invention, however, is not restricted to using smart antenna wireless communications systems.

Referring to FIG. 1A, an overview of one embodiment of the present invention is illustrated. While the system is shown operating in a wireless local loop system, other wireless systems in which part of the link from a subscriber unit to the telephone network is via a wireless link between the subscriber unit and a base station. In a wireless local loop system, a telephone device 100 is a connected part of a subscriber unit 102. The subscriber unit 102 interfaces the telephone device 100 with the rest of the WLL system. The subscriber unit also comprises a transceiver 104. The telephone device 100 may be a conventional telephone POTS for Plain Old Telephone Set), facsimile machine, data modem, or cordless telephone now common in many homes. Typically, the subscriber unit transceiver 104 is mounted at a fixed site on the outside of a structure such as an office or home. The subscriber unit transceiver 104 is used to transmit and receive telephone calls to and from a base station and other telephone devices via antenna 106.

The interface preferably comprises a power supply (not shown), a circuit for detecting whether the telephone device is in an on-hook or off hook state 101, a telephone number converter 103, and a digital signal processor (DSP) 108 having storage for programs 110. These include programs to provide a priority communication channel request, and, in some embodiments, for performing emergency call recognition based upon emergency call number sequences stored in a memory 112 of the DSP 108. In the preferred implementation, the DSP 108 and memory 112 are both part of the subscriber unit transceiver 104, and also perform other functions such as signal modulation and demodulation. All non-DSP implemented parts of the transceiver, such as the receiving and transmitting RF components, the digital to analog and analog to digital converters, are shown in block 105. The interface power supply is the same as the power supply that supplies power to the rest of the subscriber unit, for example the subscriber unit transceiver.

Note that because it is anticipated that DSP functionality, including DSP programs, may in the future be incorporated into special purpose hardware, for example as part of an application specific integrated circuit (ASIC) or part of a very large scale integrated circuit (VLSI), and because DSP functionality may also be met by other processors, for example a general purpose microprocessor, the term digital signal processor as used herein includes these equivalent alternatives.

In those embodiments wherein the emergency call recognition program is in the subscriber unit DSP, the telephone number converter 103 converts individual standard DTMF (touch-tone) or pulse dialing signals from the telephone device into digital signals. The subscriber unit DSP-based recognition program has at least one predefined sequence of digits, representing an emergency number which a user dials using telephone device 100. The sequences are shown as Emer. #1, . . . , Emer. #12 stored in memory 112 of DSP 108.

The emergency call recognition program is a series of instructions for performing digit-by-digit comparison of dialed digits to stored digits representing an emergency number and is programmed to recognize at least one emergency telephone number. The emergency telephone numbers can include the telephone numbers for the police, ambulance, fire department, poison control, 911, or any other emergency telephone number, however this list is not meant as a limitation. It is anticipated as within the scope of the present invention to have emergency numbers to be programmable by a technician in the factory or in the field.

As each digital signal is generated it is compared to a digit of an emergency number. The emergency call recognition program of the DSP recognizes if the dialed telephone number is an emergency telephone number by using digit comparison. Emergency number recognition program compares the converted digital signals to at least one predefined sequence for an emergency telephone number in digital form. The at least one predefined sequence of emergency telephone number in digital form is stored in the memory 112 of the DSP 108.

The emergency call recognition system is initiated as soon as an off-hook state is determined at the subscriber unit. The emergency call recognition system does not require the presence of a dial tone. Some implementations may include locally generating (i.e., "faking") a dial tone, while others may include, upon an off hook condition being obtained, opening a non-audio wireless channel to convey dial-tone status from the switch. Alternatively, upon off-hook, after the subscriber unit fails to obtain a channel, a special "dialing in progress" tone (which might simply be silence) is provided to the telephone device during the dialing.

Digit by digit dialing analysis comprises a method for discriminating between a potential emergency sequence and a non-emergency sequence. For example, if 9-1-1 was the only valid emergency number, means would be included for distinguishing digit-by-digit between the following three, possibly partial, digit sequence cases:

1. the given, possibly partial, digit sequence could be the beginning of an emergency call, or not, but we cannot determine yet. For example 9-1- . . . could be the beginning of 9-1-1 which would be an emergency call or it could be the beginning of 9-1-2-6-2-1-7 which might be a legitimate non-emergency call. The point is that up to the point of 9-1- . . . , the complete decision cannot yet be made and we must continue to wait for the subscriber to dial more digits.
2. no matter what digits follow the given, possibly partial, digit sequence, it could not become an emergency call phone number. For example 9-1-2- . . . cannot become an emergency call by the subsequent dialing of additional digits. The complete decision can be made and call resources can be freed immediately.
3. the digit sequence dialed so far represents a complete emergency phone number and the call should be connected expeditiously. In this example, only 9-1-1 is a complete emergency number.

In the preferred embodiment, this digit-by-digit number analysis allows non-emergency call determination as early as possible during congested situations where non-emergency calls are being dialed. While this early detection of non-emergency call numbers feature may optimally allocate call resources, the present invention, however, is not restricted to such careful implementations.

In yet another alternate embodiment, the emergency call recognition program recognizes the dialed telephone number by using audio (DTMF) comparison. Methods for recognizing, i.e., discriminating between a set of audio patterns are well known in the art. For example, methods using hidden Markov models are widely used in speech recognition and may easily be adapted for this application. The emergency call recognition program compares the DTMF audio signals to at least one predefined audio sequence for an emergency telephone number. Predefined audio sequences may also be stored in the memory of the DSP. The at least one predefined audio sequence for an emergency telephone number in digital form is located in memory 112 of DSP 108.

Storing the different sequences of emergency numbers in the memory of the DSP can be accomplished in a variety of ways. In one embodiment, a technician stores the emergency telephone numbers in the DSP memory 112. This can be done at the store or during the installation of the telephone system. In another embodiment, the users are able to store their own emergency telephone numbers in the DSP memory 112. In another embodiment, the manufacturer stores the emergency telephone numbers for a specific geographic area in the DSP memory 112.

In yet another embodiment, the emergency telephone numbers are entered automatically once the subscriber unit 102 is initialized with the rest of the system for the first time. In this embodiment, once the subscriber unit 102 is initialized, the subscriber unit makes a wireless connection to a base station which downloads the emergency numbers for the given area. In addition, the subscriber unit 102 can periodically make wireless connections to the base station to update the emergency numbers for a given area.

Several formats for storing the numbers are possible within the scope of the invention. One form is a table enumerating all possible emergency call phone numbers. Alternatively, compressed forms such as regular expressions may be used. A regular expressions is an expression in a syntax for specifying strings, typically for matching operations. See J. E. F. Friedl, *Mastering Regular Expressions: Powerful Techniques for Perl and Other Tools*, Sebastopol, Calif.: O'Reilly & Associates, 1997. (ISBN: 1565922573). Alternatively, the numbers may be stored as a set of rules, for example matching rules suitable for rule-based-analyses. Other well known storage schemes suitable for matching also may be used. For example, if 7 digit numbers beginning with 123 are emergency numbers, then this could be stored as a table enumerating 10,000 possibilities or, more compactly, as the rule "1-2-3 followed by any four digits" or as a regular expression like "123 ? ? ?". Of course combinations of these techniques are also anticipated such as lists of regular expressions. Each of the storage methods would be accompanied by a corresponding method for discriminating between an emergency and a non-emergency sequence.

If the DSP recognizes an emergency number, the DSP sends an emergency (i.e., priority) communication channel request to its base station in the WLL system. The request for a priority communication channel assignment is transmitted by subscriber unit transceiver 104 to the base station. The base station responds to the request for a priority communication channel assignment by providing a communication channel to the emergency caller. The base station disconnects a non-emergency call to provide the emergency caller a communication channel in the case that no other communication channels are available.

Figure 1B:
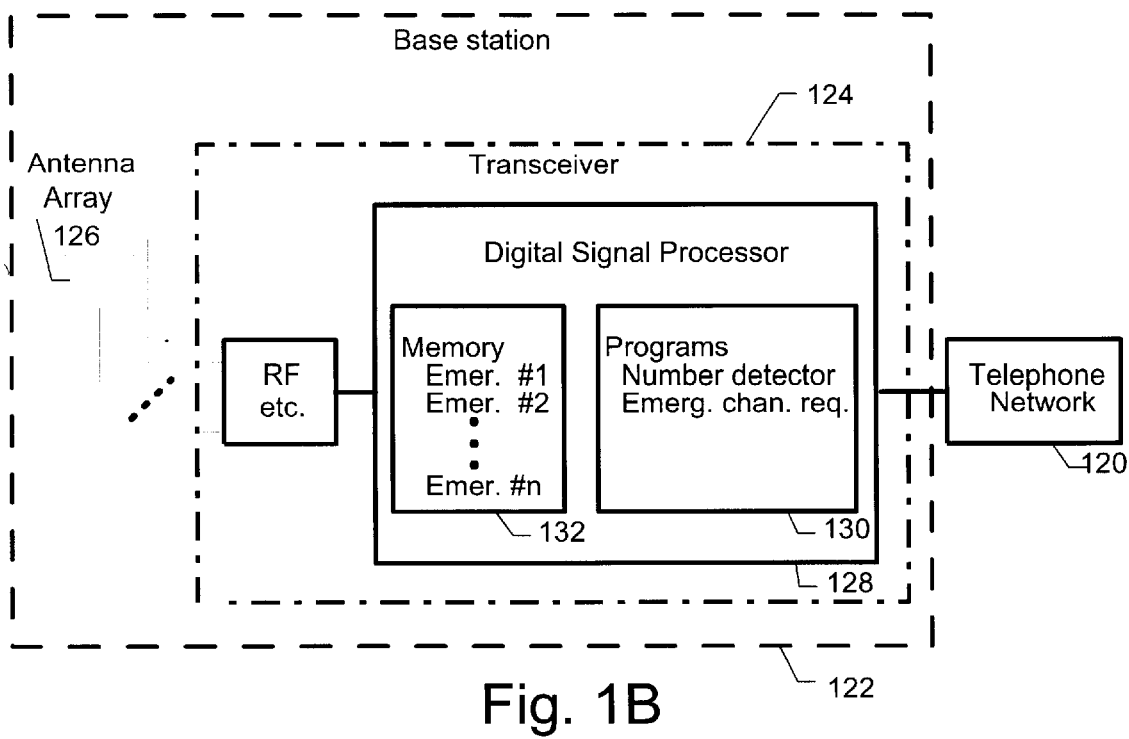
FIG. 1B illustrates an overview of a communication station (i.e., a base station) on which an alternate embodiment of the present invention is implemented.

Referring to FIG. 1B, an overview of another embodiment of the present invention is illustrated. FIG. 1B shows a communication station (i.e., a base station) 122 which is part of a wireless local loop system and is connected to a telephone network 120. The base station 122 interfaces the telephone network 120 with the rest of the WLL system, including its subscriber unit 102. The base station also comprises a transceiver 124, which in the preferred embodiment uses an array of antennas 126 to communicate with its subscriber units, such as subscriber unit 102. In one embodiment, the base station comprises at least one digital signal processor (DSP) 128 having storage for programs 130. These include programs to provide a priority (emergency) communication channel between the telephone network and a subscriber unit, and, in some embodiments, for performing emergency call recognition based upon emergency call number sequences stored in a memory 132 of the DSP 128. The preferred embodiment uses the DSP(s) of base station transceiver 124. Note that while the preferred embodiments described herein include DSP programs, as in the subscriber unit of FIG. 1A, such DSPs and programs may in the future be incorporated into special purpose hardware, for example as part of an application specific integrated circuit (ASIC) or part of a very large scale integrated circuit (VLSI). As would be clear to those of ordinary skill in the art, a general purpose microprocessor may also be used instead of a DSP device. Also, the DSP function may be incorporated into part of a larger ASIC as is common in the art.

The storage of the emergency calls and the emergency call recognition program is as described above for the case where the call recognition program is in the subscriber unit DSP 108. In this case, the at least one predefined sequence of digits, representing an emergency number, are shown as Emer. #1, . . . , Emer. #12 stored in memory 132 of DSP 128.

Subscriber Unit Detection of Emergency Numbers

Figure 2:
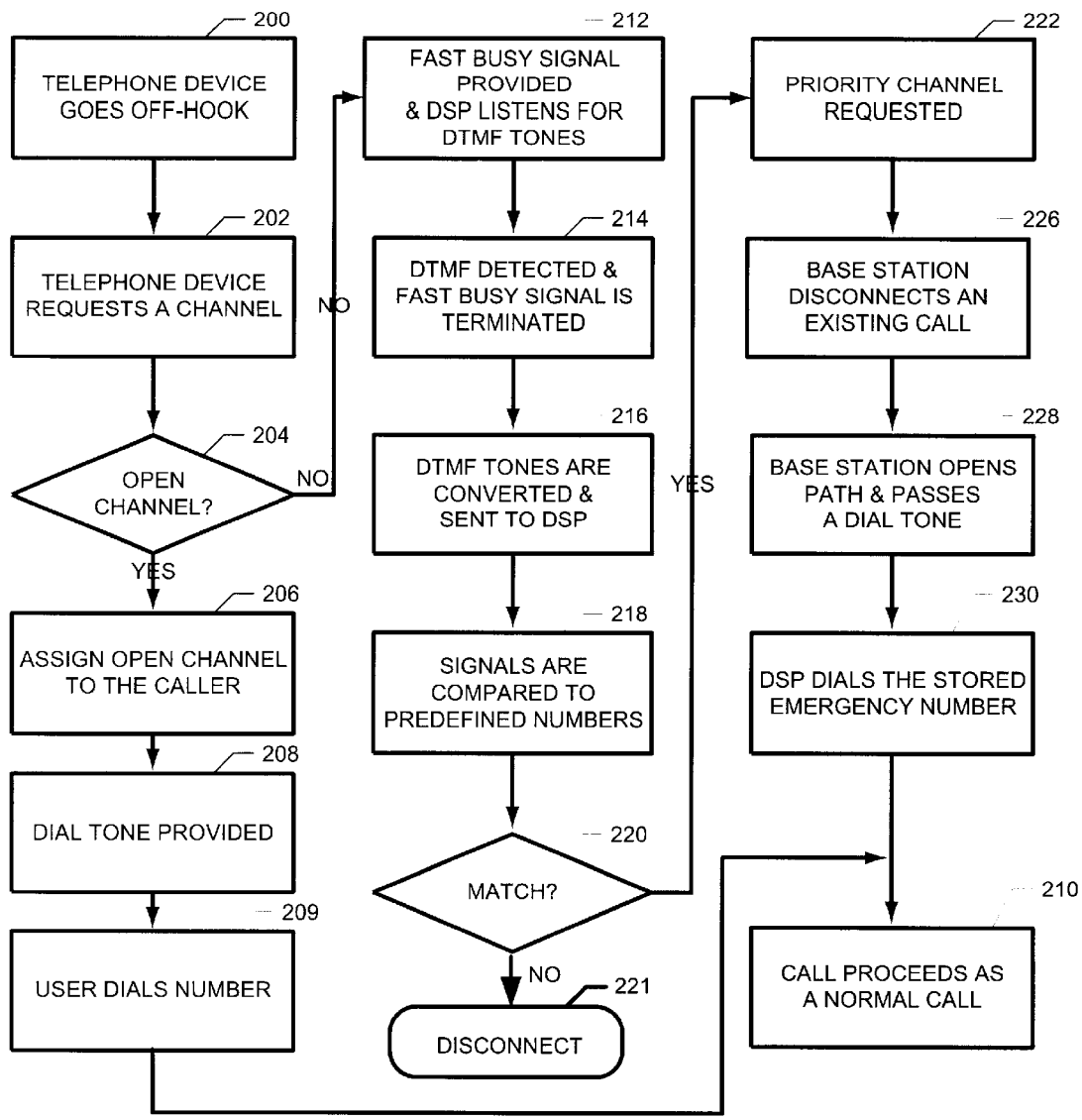
FIG. 2 illustrates a procedure for using one embodiment of the present invention.

Referring to FIG. 2, the procedure for one embodiment of the present invention where channel allocation is made from existing utilized channel and where emergency call sequence recognition occurs in the subscriber unit is illustrated. The telephone device goes off-hook 200. The subscriber unit requests a communication channel 202 from the base station. At this point, a dial tone is not present. The base station determines if there is an open communication channel which can be assigned to the telephone device 204. If there is a communication channel available, the communication channel is assigned to the caller 206. The switch then provides a dial tone to the caller 208. The caller now dials the number 209 and the call proceeds as a normal call 210.

If there are no communication channels available, then the telephone device is provided with an indicator that a channel is not available, i.e., a "try-later" signal such as a "fast busy" signal, and the subscriber unit begins to listen for DTMF tones 212 generated by the user dialing the emergency number. Once a DTMF tone is detected by the DSP, the "fast busy" signal is terminated 214. The DTMF tones are then converted to digital signals in a sequence and sent to the DSP 216. An emergency call recognition program then compares the digital signals, digit by digit, to at least one predefined emergency telephone number 218. If any one digit of the sequence of digital signals fails to match the predefined stored emergency telephone number 220 when that digit is dialed, then the call is disconnected 221.

If the sequence of digital signals dialed matches a predefined stored emergency telephone number 220, then an emergency (i.e., priority) communication channel request is sent to the base station 222. The base station then disconnects an existing call 226, and assigns this channel to the user. The Call Disconnect procedure is described below. The base station then assigns a channel to the user, thus opening a path to the telephone device from the switch and passing the switch-generated dial tone to the telephone device 228. Upon detection of the dial tone by the DSP, the DSP dials the pre-configured emergency number stored in the memory of the DSP 230 that was recognized by the DSP and which the caller previously dialed. Once the DSP completes dialing the entered emergency number, the call proceeds as a normal call 210.

Subscriber Unit-based Discrimination: Some Variations

The subscriber unit typically contains the following elements: a circuit for detecting whether or not the telephone set is "off-hook, i.e., activated or deactivated, a circuit for converting the telephone set audio-band analog signals into digital signals, a signal processing mechanism capable of recognizing emergency telephone numbers by comparing digit sequences to a pre-stored emergency phone number description, the description being of one or more pre-defined emergency number sequences and stored using table enumeration, regular expression, procedural description, or rule-based description, a channel requesting mechanism, a mechanism capable of notifying the base-station that the requested call is of an emergency or priority nature, and a processing mechanism capable of continuing or discontinuing call progress based on digit sequence detected or upon request of a base-station.

In the embodiment in which the dialed digit detection and phone number analysis for the purpose of emergency/non-emergency call discrimination occurs in the subscriber unit, several variations are possible as to what happens once an off-hook state is detected at the subscriber unit. For example, upon off-hook, the subscriber unit can immediately fake a dial tone. At that point, the subscriber unit can immediately attempt to open an audio channel, or can postpone attempting to open an audio-grade channel until a complete phone number has been dialed, or can postpone attempting to open an audio channel until the called party answers, since sometimes the party may not answer. In another variation, upon off-hook, a non-voice channel to the base station is obtained and then used to convey dial-tone status from the switch. Again, the subscriber unit can immediately attempt to open an audio channel, or can postpone attempting to open an audio-grade channel until either a complete phone number has been dialed, or until the called party answers.

In the preferred subscriber unit-detection embodiment, upon off-hook, the subscriber unit tries to establish an audio channel, and on failure, provides an audio signal (typically a tone or possibly even silence) to the user during which digit collection continues regardless of the type of tone. Thus, in one version, the audio signal is null (silence), but the subscriber unit continues processing digits, while in another version, the audio signal is a substantially dial-tone-like "fake dial tone", and in yet another version, the audio signal sounds different from dial-tone, for example a "fast busy."

In the preferred embodiment, once the call is determined to be an emergency call, it is tagged as emergency for the purpose of enhancing its reliability for the remainder of the call duration. A call so tagged will not be allowed to be dropped or otherwise degraded in response to other emergency call attempts.

In this embodiment, the subscriber unit decides whether or not the phone number is an emergency call. The subscriber unit unilaterally takes the decision to discontinue the call when it is determined that the call is a non-emergency call. In an alternate embodiment, the subscriber unit simply provides the emergency/non-emergency status of the call to the communication-station using one of the control channels normally used for status and channel assignment in the wireless communication system. The base station then uses this information, including the phone number (or partial number) that was dialed. This phone number is provided by the subscriber unit to the communication-station's channel allocation means which subsequently uses the phone number information to decide which calls may be dropped. In yet another alternate, if and when the subscriber unit can be sure the call is not an emergency call, the subscriber unit tells the communication-station immediately that the call is not an emergency. The communication-station can then perform a system capacity/load check to decide if the call should be allowed to continue. In such a case, the communication-station can temporarily store the emergency determination status to use when deciding which calls to drop (or degrade) if and when such dropping or degrading becomes necessary.

Base Station Detection of Emergency Numbers

A WLL system is licensed to have a certain number of channels. One aspect of the emergency call communication channel allocation feature of the present invention allows a certain number of those full rate channels to be reserved (reserve channels) for detecting emergency calls. While this scheme reduces the maximum capacity of the system for non-emergency calls, the grade of service for emergency calls is dramatically improved.

Figure 3A:
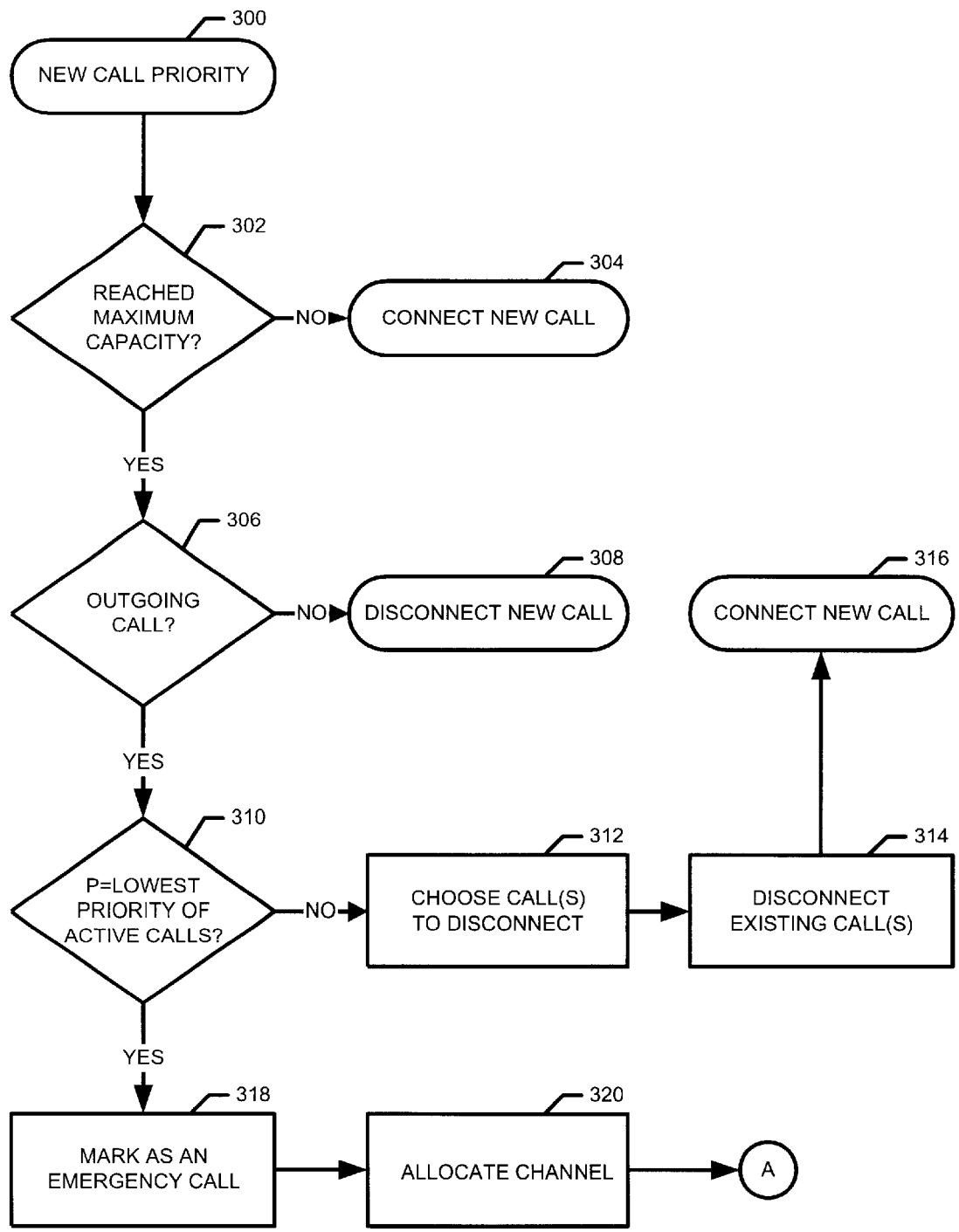
FIG. 3A illustrates a data flow diagram of the decision process for allowing emergency calls to be placed.

Referring to FIG. 3A, the flow diagram for the base station detection of emergency telephone numbers is illustrated. In this alternate embodiment, all of the subscriber units of the present invention have priorities assigned to them based in part on the level of service reserved (e.g., purchased) by the subscriber unit owner. When a channel request (for example for a call) is made, a priority flag 300 is sent to the base station. The base station determines if the system is at its maximum capacity 302. If the system is not at its maximum capacity, communication channels are available and the call is connected 304.

If the system has reached its maximum capacity, the base station determines if the channel request being placed is for an outgoing call 306, that is, whether the channel is request is not one for maintenance but for the purpose of placing a call beyond the base station. If the request being made is not for an outgoing call and the system capacity is at its maximum, the call is disconnected 308 and the user must try again later. If the request is for an outgoing call, the base station checks to see if the call is the lowest priority of all active calls on the system 310. If there are lower priority calls on the system, calls of a lower priority are singled out to be disconnected 312. Thereafter the lower priority call selected is disconnected 314 so that the higher priority call can be connected 316.

If there are no lower priority calls on the system, the call is marked as an emergency call 318 and the base station performs further analysis on the call 320. At his juncture the caller is provided with a full rate communication channel which is one of the several full rate communication channels of the system that are reserved for emergency call use.

Figure 3B:
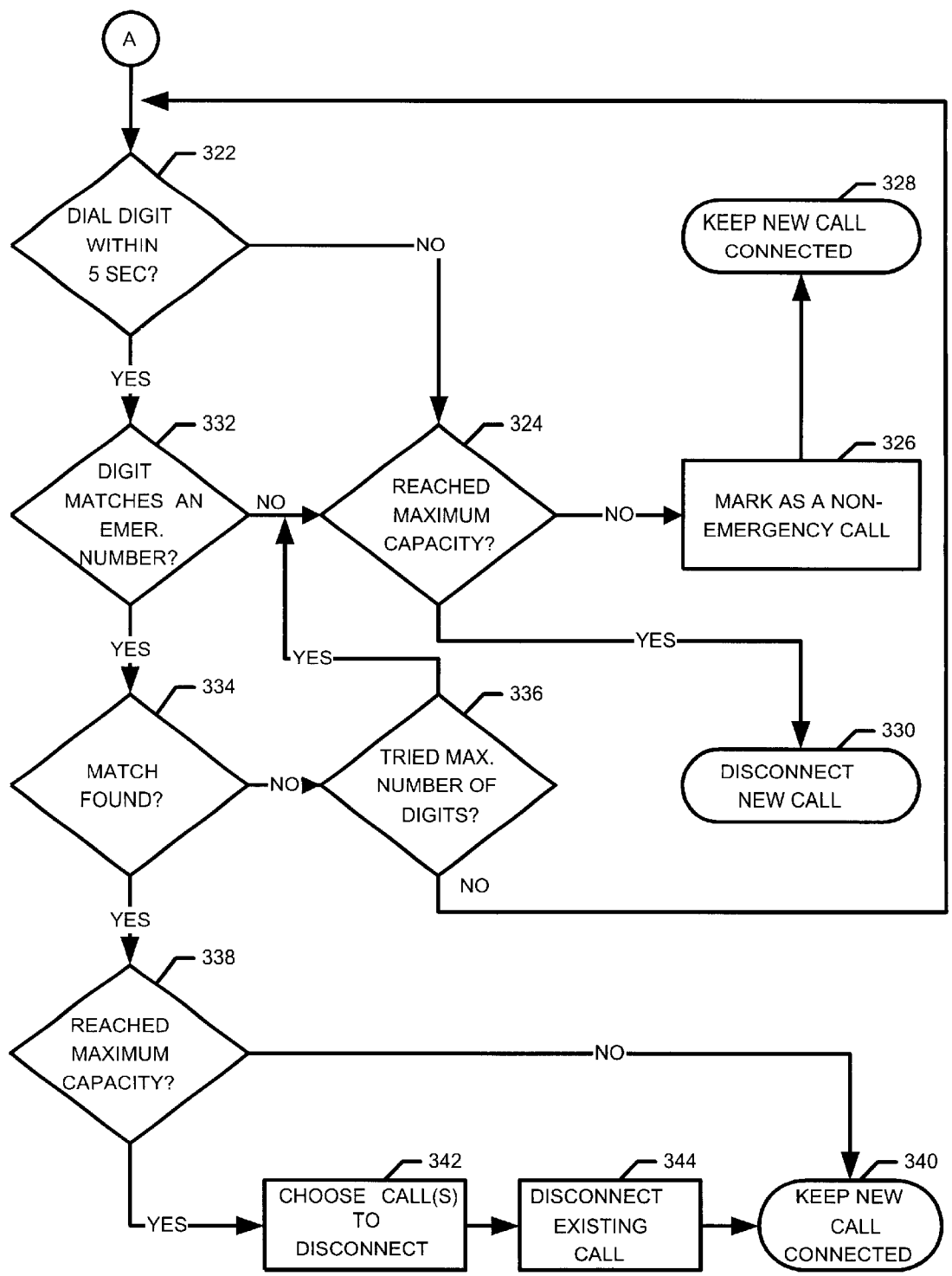
FIG. 3B continues the illustration of flow diagram for the decision process of allowing an emergency call using the present invention.

Referring to FIG. 3B the analysis of a potential emergency call is further illustrated. This analysis is done one digit at a time. If the caller does not dial a digit within a time limit, i.e., five (5) seconds 322, then the system determines if all of the communication channels are in use, i.e., if the telephone system has reached maximum capacity 324. If the telephone system has not reached capacity, then the call is marked as a non-emergency call 326 and the system maintains the connection 328. However, if the telephone system has reached maximum capacity 324, then the caller is disconnected 330.

If the caller does dial a digit within a time limit, i.e., five (5) seconds 322, then the system determines if the dialed digit matches the correspondingly positioned digit of any of a predefined sequence of numbers representing an emergency number 332. The system then determines if all the digits dialed so far match any of a predefined sequence of numbers representing an emergency telephone number 334. If dialed digits do not yet match a predefined sequence of numbers representing an emergency telephone number, then the system determines if the caller is done dialing 336. This is accomplished by known dialing rules, for example, if the first digit a caller dials is a one (1), then the caller must dial ten (10) more digits to complete the call. If the caller is not done dialing, then the system goes back to step 322 for the next digit. That is, the system checks if the caller has dialed another digit within a time limit, i.e., five (5) seconds 322, and so forth as described above. Otherwise, if the maximum number of digits has been dialed, and in step 334 a match to an emergency telephone number is found, then the system determines in step 338 if another caller must be disconnected in order for there to be maintained a full rate communication channel for another potential emergency call. If the system has reached maximum capacity 338, then the system chooses a call to disconnect 342 and disconnects the caller 344 and maintains the connection for the emergency caller 340 and reserves a full rate channel for future emergency calls. In alternate embodiments that allow for multiple rate calls, such as half rate voice calls, or twice full rate data transfer calls, rather than disconnect a call, one or more calls are downgraded (for example from full rate 32 kbps to half rate 16 kbps, or from a 2-channel 64 kbps link used for data to a slower 32 kbps link) in order to provide the necessary free full-rate channel for the emergency call.

If the system has not reached maximum capacity, then the system maintains the connection 340.

Communication Channel Allocation (Less Than Full Rate)

A low rate communication channel is a communication channel which operates at a lower speed than a full rate communication channel. In one embodiment, the low rate communication channel operates at 250 bps which is 1/128 of a full rate communication channel. The full rate communication channels operate at 32 kbps. In order to use a low bit-rate communication channel, the telephone device uses compression using a special vocoder. The special vocoder is capable of working with two (2) discrete sine waves. The special vocoder in is stored in a DSP located in either the telephone device or interface as described in the earlier embodiments. The two simultaneous tones are adequate to pass DTMF, dial tone, busy signal, fast busy, etc., including all standard audio band signaling mechanisms used in telephone systems today. Thus when all of the full rate communication channels for a wireless local loop telephone system are in use, a caller can still receive dial-tone from the switch and dial a telephone number using a low rate communication channel. Note that in this embodiment, the audio signal compressor in the subscriber unit does not explicitly "recognize" the digits. It only finds discontinuities of tones and signals the frequency and amplitude of the tonal components as they appear. It is up to the base-station to turn this tone sequence encoding into digit sequences and then, perhaps, do emergency call discrimination.

Many methods are known for providing low-rate channels in a manner compatible with a given air interface standard. The preferred embodiment uses the Personal HandyPhone system (PHS) standard described, for example in the Association of Radio Industries and Businesses (ARIB, Japan) Preliminary Standard, Version 2, RCR STD-28 and Technical Standards of the PHS Memorandum of Understanding Group (PHS MoU—see http://www.phsmou.or.jp). In time-division (i.e., slotted) air-interface standards such as PHS, ½-rate (16 kbps) and ¼-rate (8 kbps) connections are supported by providing rate handshaking between the subscriber unit and the base station at the start of the low-rate connection, and then transmitting only on every other (for ½-rate) or every fourth (for ¼-rate) communication slot that would normally be used by a full-rate connection. While not directly supported in the PHS standard, this method may be extended in an obvious manner to support any fractional rate, such as the preferred rate of 1/256. Similar fractional-rate methods may be applied to other air-interface standards. Alternatively, low-rate connections may be carried out using any of a variety of well-known random access technique. The random access uplink technique used in PHS for link channel requests can be easily modified to carry low-rate compressed audio traffic on a different dedicated channel. With this method, uplink messages are sent on a shared random access channel and the base station positively acknowledges each message it receives. If a subscriber unit does not receive an acknowledgement, it waits a proscribed amount of time and retransmits. In this way many low-rate uplink users may share a common channel. On the downlink, the base station sends messages (e.g., compressed audio signals) on a common downlink channel, using a messaging protocol analogous to that used for the downlink PHS downlink link channel assignment messages. Each message contains both a payload and a subscriber unit address field. The address field enables the targeted subscriber to identify and extract those messages it is intended to receive.

How one may achieve compression for use in the low-rate channel is now described in more detail. Many methods for reducing downlink bandwidth may be used. For example, if the switch is able to generate only a small number of distinct audio signals during call connection, e.g., dial tone or fast busy, then these audio signals may be broadcast to all subscriber units using a single broadcast channel, switching between the audio signals in a cyclic fashion. A very low-rate downlink signaling channel is then used to individually instruct a subscriber unit to either play back a particular received broadcast audio signal to the telephone device, to play back silence to the telephone device, or to enter normal audio processing mode. Alternate compression schemes may be used to pass the signaling information. Methods for compressing audio signals are known in the art. Compression methods take as input a sampled digital version of an audio signal and produce a digital sequence that represents the salient audio features of the signal in compact form. Compressing audio signals that consist of a mixture of tones is a particularly straightforward problem; compression methods that work well for speech signals will also work well for mixtures of tones, such as occurs in DTMF signals, as mixtures of tones may be viewed as a special case of audio signals, and indeed many compression methods used for telephony applications are designed specifically to pass DTMF tones and other signaling tones with minimal distortion. Any standard low-rate speech compression method may therefore be used in the invention, provided that the method preserves the frequency of signaling tones.

Preferably, however, a method with much lower computational complexity is used. Many methods exist for counting the number and determining the frequency of tones in a signal that consists of a mixture of tones. The preferred method divides the quantized audio sequence into blocks of duration 10 millisecond, applies a computationally efficient tone estimation method such as ESPRIT (see, for example, U.S. Pat. No. 4,965,732 to Roy, III, et al., entitled METHODS AND ARRANGEMENTS FOR SIGNAL RECEPTION AND PARAMETER ESTIMATION), and outputs a sequence of values for each 10 millisecond block representing the number, frequency, and intensity of those tones (up to a maximum of two tones) whose intensity exceeds a proscribed minimum sensitivity value for DTMF detection. If no significant tones are present then a silence indicator is produced for the block. The compressed sequence that results from the processing of the 10 millisecond blocks is then subject to run-length coding to further collapse tones sustained over multiple 10 millisecond blocks into a single frequency/intensity/duration indicator. Other compression methods more efficient than run-length coding may also be used.

Figure 4A:
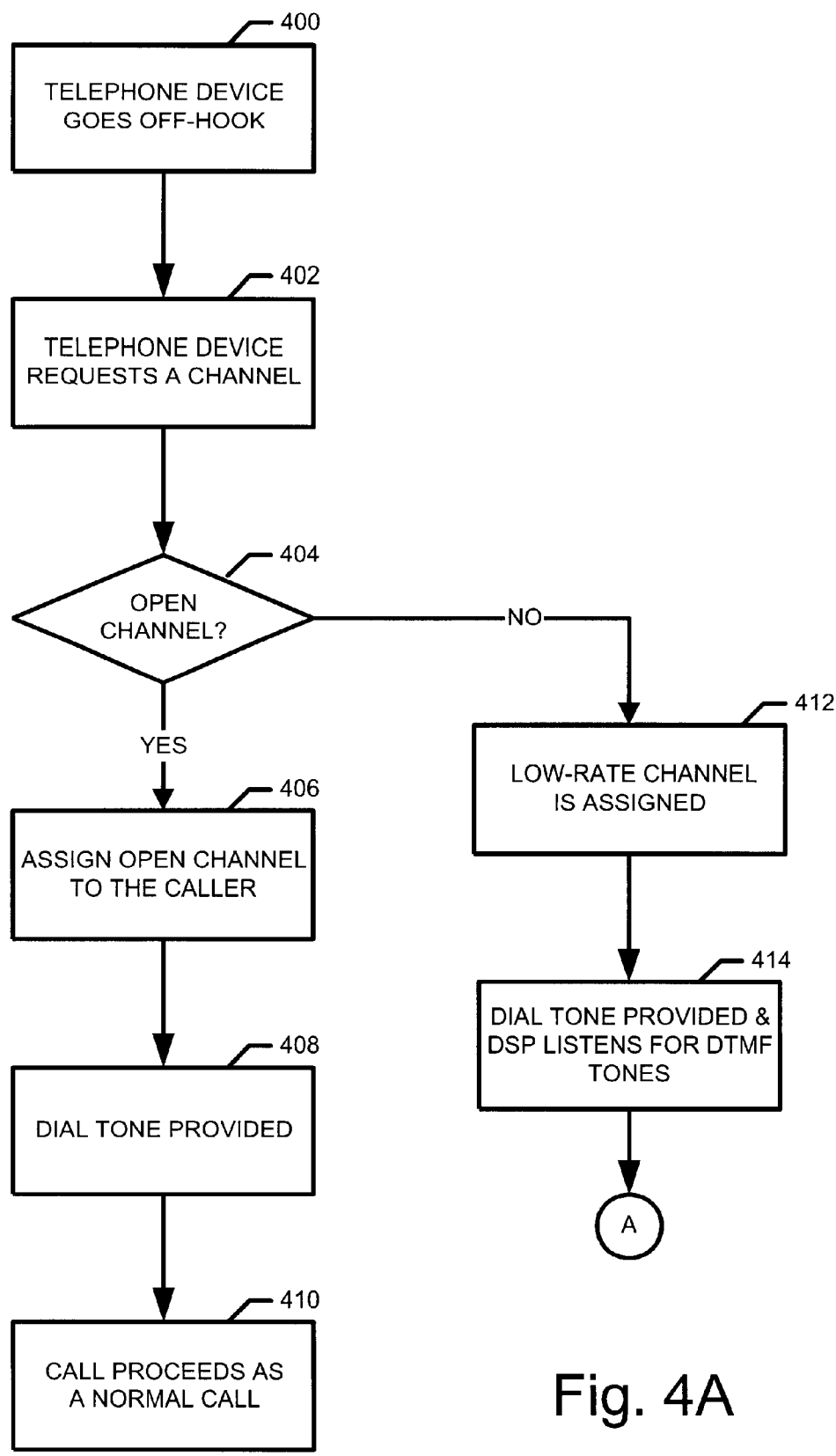
FIGS. 4A and 4B illustrate another embodiment of the present invention which uses a low rate uplink to the base station where detection of the emergency number sequence is made.
Figure 4B:
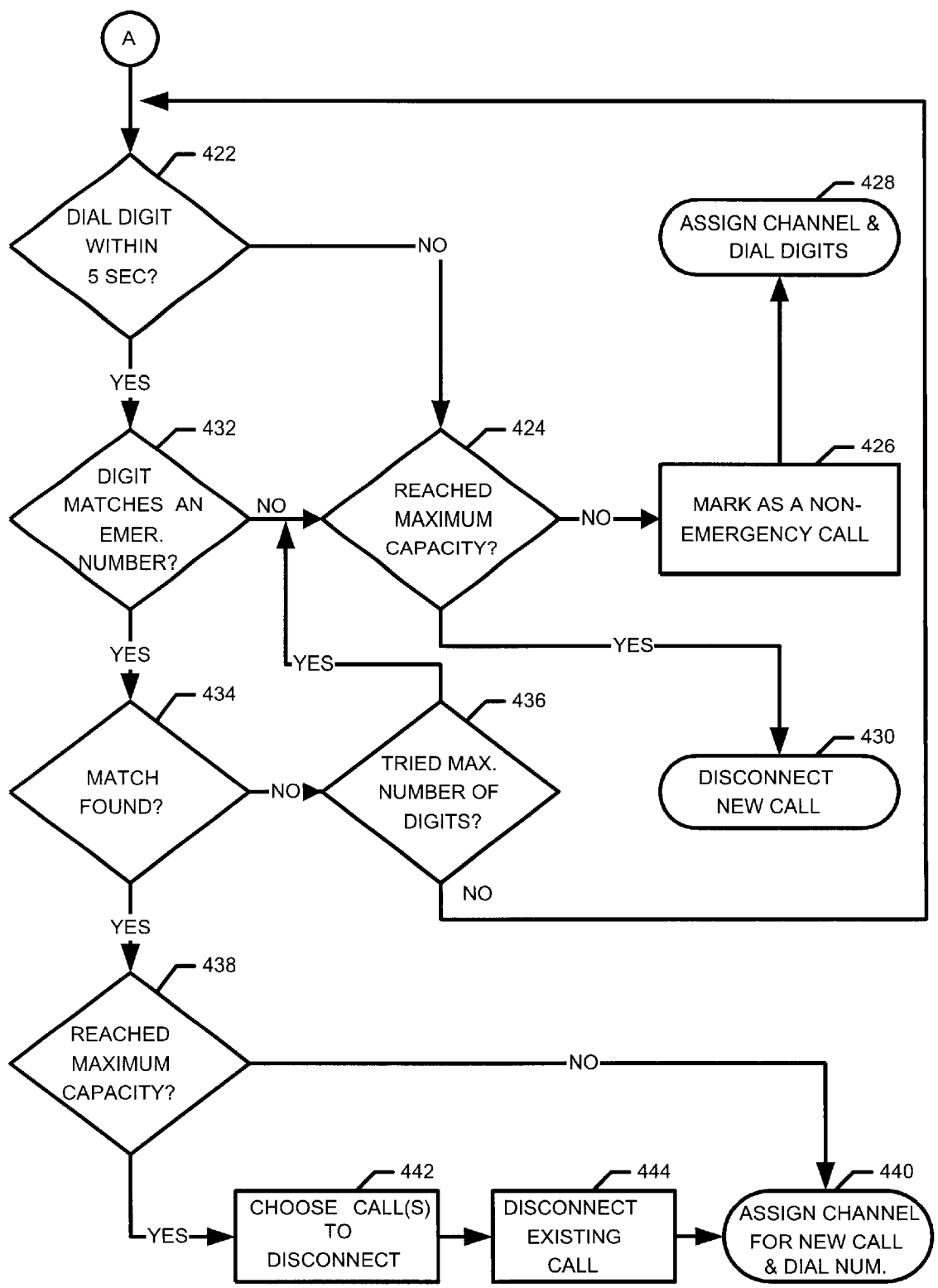

An alternate embodiment of the present invention which uses a low rate link to the base station where detection of the emergency number sequence is made is illustrated in FIG. 4A and FIG. 4B. The subscriber unit goes off-hook 400. The subscriber unit requests a communication channel 402. At this point, a dial tone is not present. The base station determines if there is an open full rate communication channel which can be assigned to the caller 404. If an open full rate communication channel is available, the open full rate communication channel is assigned to the caller 406. The system then provides a dial tone to the caller 408. The call proceeds as a normal call 410.

If there are no open full rate communication channels available, then the subscriber unit is provided with a low bit-rate communication channel 412. A low bit-rate communication channel is a communication channel which operates at a lower bit-rate than a full rate communication channel. In one embodiment, the low rate communication channel operates at 250 bps which is $\frac{1}{128}$ of a full rate communication channel. The full rate communication channels operate at 32 kbps. In order to use a low rate communication channel, the telephone device uses compression using a special vocoder. The special vocoder is capable of working with two (2) discrete sine waves. The special vocoder in is stored in a DSP located in either the telephone device or interface as described in the earlier embodiments. Such a compression allows DTMF tones and possibly one or more signals to be transmitted to the base station. Such a low rate vocoder is also capable of transmitting the dial tone, busy signal, and other call progress signals to the subscriber unit in the downlink direction.

The base station provides a dial tone to the caller and a DSP at the base station (base station DSP) listens for the codes for DTMF tones 414 which have been passed from the subscriber unit to the base station on the low bit-rate channel. Referring now to FIG. 4B, 422, if the caller does not dial a digit within a time limit, i.e., five (5) seconds 422, then the system determines if all of the communication channels are in use, i.e., if the telephone system has reached maximum capacity 424. If the wireless system has not reached capacity, then the call is marked as a non-emergency call 426 and the system assigns a full rate channel and dials the digits dialed so far, and the call is continued as a normal call 428. However, if the telephone system has reached maximum capacity 424, then the caller is disconnected 430.

If the caller does dial a digit within a time limit, i.e., five (5) seconds 422, then the base station determines if the dialed digit matches the correspondingly positioned digit of any of a predefined sequence of numbers representing an emergency number 432. The system at the base station then determines if all the digits dialed so far match any of a predefined sequence of numbers representing an emergency telephone number 434. If dialed digits do not yet match a predefined sequence of numbers representing an emergency telephone number, then the system determines if the caller is done dialing 436. This is accomplished by known dialing rules, for example, if the first digit a caller dials is a one (1), then the caller must dial ten (10) more digits to complete the call. If the caller is not done dialing, then the system goes back to step 422 for the next digit. That is, the system checks if the caller has dialed another digit within a time limit, i.e., five (5) seconds 422, and so forth as described above. Otherwise, if the maximum number of digits has been dialed, and in step 434 a match to an emergency telephone number is found, then the system determines in step 438 if another caller must be disconnected in order for there to be maintained a full rate communication channel for another potential emergency call. If the system has reached maximum capacity 438, then the system chooses a call to disconnect 442 and disconnects the caller 444 (or chooses one or more calls to downgrade and so downgrades these calls) and assigns the new full-rate channel for the emergency caller 440, including dialing the number dialed. Similarly, if the system has not reached maximum capacity, then the system assigns a new full-rate channel for the emergency caller 440, including dialing the number dialed.

In alternate embodiments that allow for multiple rate calls, such as half rate voice calls, or twice full rate data transfer calls, rather than disconnect a call, one or more calls are downgraded (for example from full rate 32 kbps to half rate 16 kbps, or from a 2-channel 64 kbps link used for data to a slower 32 kbps link) in order to provide the necessary free full-rate channel for the emergency call.

Call Disconnect Procedure

The WLL system of the preferred embodiment of the present invention provides six levels of caller priority which can be assigned to different customer classes. High priority outgoing calls have an improved chance of connecting in a system that has reached maximum call capacity. The priority level of each subscriber unit is assigned by the base station when the subscriber unit is brought on line. When the system is operating at maximum capacity and a call is attempted, the priority of the new call's subscriber unit is compared to the priority of existing calls on the system. A new call may preempt any call that has a lower priority level than itself. A lower priority call is be disconnected so the new call can be assigned its resources. If the call is from a multi-rate subscriber unit, one or more than one call resource is be disconnected so that the multi-rate call can be accommodated at the higher rate. For example, double-rate calls use two channels and are supported. Similarly, half rate calls use half a channel. The method of selecting which call(s) to disconnect is performed as follows:

1. The set of possible calls to disconnect is restricted to those with the lowest priority that are connected to the system, excluding those calls that are designated as emergency calls.
2. If there are any calls among those lowest priority calls which are in the process of being connected, a call is selected from among them, and that call is not connected.
3. If there are no calls being connected (i.e., all calls are already connected), a call is selected at random from the set of lowest priority calls and disconnected in favor of the emergency call.
4. If there are no calls with a lower priority on the system, the call will go through a process to determine if it is an emergency call.

In short, any user of a WLL system who dials a recognizable emergency call using either a DTMF or pulse telephone will have an increased chance of the emergency call going through, even if the system is operating at its maximum capacity.

In alternate embodiments that allow for multiple rate calls, such as half rate voice calls, or twice full rate data transfer calls, rather than disconnect a call, one or more calls are downgraded (for example from full rate 32 kbps to half rate 16 kbps, or from a 2-channel 64 kbps link used for data to a slower 32 kbps link) in order to provide the necessary free full-rate channel.

Time-Out Procedure

In order for the system of the present invention to not be overcrowded with repeated erroneous calls, a time out program is resident in the DSP of the base station. This program allows a user selectable certain number of non-emergency calls to be attempted during times of peak use from a given subscriber unit. When a subscriber unit exceeds the number of allotted call attempts during a peak period, the base station denies further access to that subscriber unit for a set period of time. After the expiration of that time, the subscriber unit is again permitted to attempt phone calls. In this manner, the system is kept from being overcrowded in the processing of those calls that are potentially emergency in nature.

Base Station-Based Discrimination: Some Variations

The preferred embodiment for base-station based phone number analysis for the purpose of emergency/non-emergency call discrimination also includes base-station dialed digit detection. As described above, in one version, low-rate channels are used during the call setup phase to carry the dial tone, DTMF digits, pulse-dial-events, and other low-information-bit-rate call setup signaling. In another version, a certain number of full-rate reserve channel is made available. Calls in their startup phase can occupy a full-rate reserved channel. When a non-emergency call is confirmed in the reserved channel, the call is moved into the non-reserved channel set. If this cannot be accomplished, the call is discontinued.

In the low-rate channel scheme, in one version, the low-rate channel is preserved until connect. When it is confirmed that the wireless system is at full load and the non-emergency status is confirmed, the call is discontinued. When, on the other hand, the wireless system is not at full capacity, the call is promoted to a full rate (i.e., voice-capable) channel if and when the call connects. When it is confirmed that the wireless system is at full voice channel capacity and that the call is an emergency call, another call is dropped (or one or more calls are degraded in data-rate) to make room for the emergency call. Preferably, in such a case, the emergency status is remembered by the base-station for use in call dropping decisions.

In the low-rate channel scheme, in another version, the low-rate channel is used only until emergency status can be confirmed or denied. When it is confirmed that the wireless system is at full load and the non-emergency status is confirmed, the call is discontinued. When, on the other hand, the wireless system is not at full capacity, the call is promoted to a full rate (i.e., voice-capable) channel if and when the call connects. When it is confirmed that the wireless system is at full voice channel capacity and that the call is an emergency call, another call is dropped (or one or more calls are degraded in data-rate) to make room for the emergency call. Preferably, in such a case, the emergency status is remembered by the base-station for use in call dropping decisions.

In the reserve full-rate channel scheme, in one version, when a call made on one of the reserved channels is confirmed to be an emergency call, a non-emergency call is dropped to restore a channel to the reserved channel pool. In the preferred version, calls that have not (yet) been confirmed as emergency calls that are occupying one of the reserved channels, have a inter-digit dialing time imposed to limit time occupying a reserved channel. In yet another version, any call that has not (yet) been confirmed as an emergency call, and that is occupying a reserved channel, has a maximum total dialing time imposed to limit the time any call can occupying a reserved channel.

General System Requirements

The system of the present invention is a TDMA system that operates under the personal Handiphone Standard (PHS) and includes a plurality of subscriber units. Generally each subscriber unit has three Motorola ® M56303 digital signal processors (DSP), whose characteristics are incorporated herein by reference in their entirety, one for transmission, one for reception, and one for audio signal coding and decoding. These DSPs are not meant as a limitation. Other DSPs having the capabilities of these specific DSPs are considered within the scope of the invention. Further, it is anticipated that future DSPs will be available having similar or more powerful characteristics, and would find use in the present invention. Further, it is anticipated that many of the functions now implemented by DSP programs may in the future be incorporated into special purpose hardware, for example as part of an application specific integrated circuit (ASIC) or part of a very large scale integrated circuit (VLSI). As would be clear to those of ordinary skill in the art, a general purpose microprocessor may also be used instead of a DSP device.

The base station comprises several Motorola ® M56303 DSPs, whose characteristics are incorporated herein by reference in its entirety. The number of DSPs depends on the number of antennas in the antenna array and the number of network connections available for the base station. In general, there is one for each time slot on the receive side and one for eight slots on the transmit side (the PHS system has four receive and four transmit time slots in each frequency band), although this DSP is not meant as a limitation. Several PowerPC microprocessors (Motorola®/IBM®) control the DSPs. The Motorola ® DSP56303 is a 24-bit processor of the family of processors of the designation DSP56300. Other processors of this family would be suitable substitutes as would other DSPs or DSP ASIC cores from other manufacturers, or microprocessors, or special purpose hardware or other processing means as would be clear to those in the art.

Although the present invention has been described in detail for purpose of illustration, it is understood that such detail is solely for that purpose, and variations can be made therein by those skilled in the art without departing from the scope of the invention as described. The present invention is defined by the following claims:

We claim:

1. A method facilitating a telephone call comprising:
    determining whether a communication channel is available at a servicing communication station to accommodate the telephone call;
    providing a telephone interface with an indication denoting the unavailability of a communication channel if it is determined that the communication station does not have a communication channel available; and
    receiving a digit of one or more digits of a telephone number from the telephone interface even if no communication channels are available, comparing the received digit, as received, against a corresponding digit of one or more emergency codes and, if the digits match, iteratively repeating the element of receiving for comparison of a subsequent digit of the one or more digits of the telephone number from the telephone interface, as necessary, to determine whether a priority channel request is required to facilitate an emergency telephone call, and otherwise disabling the interface from accepting further digits if it is determined that a received digit is not associated with an emergency code.

2. A method according to claim 1, further comprising,
    issuing the priority channel request to the servicing communication station if the result of the comparison reveals that the received digits correspond to an emergency code and no other communication channels are otherwise available.

3. A method according to claim 2, wherein the priority channel request denotes a priority class of service that is greater than that of non-emergency telephone calls, such that the servicing communication station reallocates communication channel parameters to facilitate the priority channel request.

4. A method according to claim 3, wherein reallocation of communication channel parameters include one or more of tearing down a lower priority communication channel to facilitate the priority channel request, reallocation of bandwidth of one or more communication channels to provide bandwidth to the priority channel request, modifying a spatial division multiple access (SDMA) reuse pattern to provide bandwidth for the priority channel request, and the like.

5. A method according to claim 1, wherein determining whether a communication channel is available comprises:

receiving an off-hook detection signal at the transceiver;

issuing a channel request from a subscriber unit to the servicing communication station; and receiving a response at the subscriber unit from the communication station to the channel request denoting whether a communication channel is available.

6. A method according to claim 1, wherein the indication that all communication channels are currently unavailable includes one or more of a fast busy signal, a null signal (silence), a monotone signal, and/or any signal other than a dial tone.

7. A method according to claim 1, further comprising:

issuing a priority channel request to the servicing communication station if a subscriber unit receives digits from the telephone interface denoting one or more emergency codes associated with one or more emergency services.

8. A method according to claim 7, further comprising:

facilitating the emergency telephone call over a communication channel made available by the communication station through call completion.

9. A method according to claim 1, further comprising:

converting dual-tone, multiple frequency (DTMF) tones received from the telephone interface representing the telephone number entered by a user to digital signal(s) for the transceiver.

10. A method according to claim 9, wherein said conversion is performed even if a subscriber unit receives an indication from the servicing communication station that all communication channels are currently unavailable.

11. A method according to claim 1, wherein the emergency codes are one or more of a telephone number, a speed-dial code and/or a shortened emergency services code.

12. An article of manufacture comprising a machine accessible storage medium to provide machine executable instructions which, when executed, cause a machine to implement a method according to claim 1.

13. A method according to claim 1, wherein the priority channel is a reduced rate communication channel reserved to facilitate emergency telephone calls.

14. A method according to claim 1, wherein the priority channel is dynamically created by a communication station by invoking spatial division multiple access (SDMA) processing to effectively parse multiple communication channels including the priority channel from a single physical channel to facilitate the emergency telephone call.

15. A wireless local loop subscriber unit comprising:

a telephone interface, to enable a user to enter a telephone number to place a telephone call; and a transceiver, coupled to the telephone interface, to receive a digit of one or more digits of a telephone number from the interface even if a communication channel is not currently available, to compare the received digit, as received, against a corresponding digit of one or more emergency codes and, if the digits match, accept and compare a subsequent digit of the telephone number from the interface, as necessary, to determine whether a priority channel request is required to facilitate an emergency telephone call, and otherwise disabling the interface from accepting further digits if it is determined that the received digit is not associated with an emergency code.

16. A wireless local loop subscriber unit according to claim 15, further comprising:

an off-hook signal generator, responsive to the telephone interface, to generate an off-hook signal to prompt the transceiver to request a communication channel from the communication station when the user lifts a handset of the telephone interface to place a call.

17. A wireless local loop subscriber unit according to claim 16, wherein the transceiver responds to the off-hook signal by requesting a communication channel and providing the telephone interface with an indication denoting whether a communication channel is available from the communication station.

18. A wireless local loop subscriber unit according to claim 17, wherein the transceiver provides one or more of a fast busy signal, a constant monotone signal, and/or any tone other than a dial tone as an indication to the user via the telephone interface that no communication channels are currently available to facilitate a telephone call.

19. A wireless local loop subscriber unit according to claim 15, further comprising:

a dual-tone, multiple frequency (DTMF) converter to convert DTMF signals generated by the telephone interface representing the telephone number entered by the user in to digital signals appropriate for input to the transceiver.

20. A wireless local loop subscriber unit according to claim 19, wherein the DTMF converter remains enabled to receive and convert DTMF signals for the transceiver even if the transceiver determines that no communication channels are currently available until it is determined that a received digit does not correspond to an emergency services code.

21. A wireless local loop subscriber unit according to claim 20, wherein the transceiver receives and decodes the digital signals to determine whether the user is dialing an emergency number, even if there are no communication channels available to support the call.

22. A wireless local loop subscriber unit according to claim 21, further comprising:

a memory device, to store one or more codes associated with an associated one or more emergency services, wherein the transceiver compares received digital signals associated with a user-entered telephone number against the stored one or more codes to determine whether the user is telephone number is associated with the one or more emergency services.

23. A wireless local loop subscriber unit according to claim 22, wherein the transceiver compares the digital signals associated with the user-entered telephone number on a digit-by-digit basis concurrently with receipt of the digits against corresponding digits of the one or more stored emergency codes, and disables receipt of further digits if the comparison reveals that a received digit does not conform to a corresponding digit of an emergency code(s).

24. A wireless local loop subscriber unit according to claim 15, the transceiver comprising:

a memory, to receive and retain one or more codes associated with one or more emergency services; and a processor, coupled to the memory, to receive digital signals representative of the dialed telephone number and compare the received signals to the one or more codes stored in memory to detect telephone calls to the one or more emergency services.

25. A wireless local loop subscriber unit according to claim 15, further comprising:

an on/off-hook detector, coupled between the telephone device and the transceiver, to provide an off-hook indication to the transceiver when the user lifts a handset of the telephone interface.

26. A subscriber unit according to claim 15, wherein the priority channel is a reduced rate communication channel reserved for emergency telephone call, and wherein the transceiver includes reduced rate communication facilities.

27. A subscriber unit according to claim 15, wherein the priority channel is a spatial division multiple access (SDMA) enabled channel to facilitate an emergency telephone call.

28. A wireless communication system comprising:
- a communication station, to communicatively couple one or more wireless subscriber unit(s) to a wireline telephony network; and
- a wireless subscriber unit, communicatively coupled to the communication station, to accept entry of a digit of a telephone number through a telephone interface even after determining that no communication channels are currently available between the subscriber unit and the communication station, the subscriber unit to compare the received digit, as received, against a corresponding digit of one or more emergency codes and, if the digits match, accept and compare a subsequent digit of the telephone number from the interface, as necessary, to determine whether a priority channel request is required to facilitate an emergency telephone call, and otherwise disabling the interface from accepting further digits if it is determined that the received digit is not associated with an emergency code.

29. A wireless system according to claim 28, the wireless subscriber unit comprising:
- a transceiver, coupled to the telephone interface, to accept the telephone number entered by the user even after determining that no communication channels are currently available, and to issue a priority channel request for a communication channel if the telephone number entered corresponds to one or more stored emergency codes associated with a commensurate one or more emergency services.

30. A wireless system according to claim 29, wherein the transceiver issues one or more priority channel request(s) to the communication station to obtain a communication channel if no communication channels are otherwise available upon detecting entry by the user of a code associated with an emergency service.

31. A wireless system according to claim 29, wherein the stored codes include one or more of a standard telephone number associated with a single emergency service, a speed dial code, and/or a shortened telephone number to an agency serving multiple emergency services.

32. A wireless system according to claim 31, the subscriber unit further comprising:
- a memory device, coupled to the transceiver, to receive and retain one or more emergency codes.

33. A wireless system according to claim 28, the communication station comprising:
- a transceiver, to receive priority channel requests from one or more subscriber units and modify one or more communication channel parameters to accommodate a priority channel request when no communication channels are otherwise available.

34. A wireless system according to claim 33, wherein the modification of one or more communication channel parameters includes one or more of tearing down an existing call to free the communication channel to accommodate the priority channel request, lowering bandwidth associated with one or more communication channels to free bandwidth for an additional communication channel to accommodate the priority channel request, and/or modifying one or more spatial division, multiple access (SDMA) reuse parameters to obtain a communication channel to accommodate the priority channel request.

35. A wireless communication system according to claim 28, wherein the wireless communication system is a wireless local loop (WLL) communication system, and the subscriber unit is a WLL subscriber unit.

36. A wireless communication system according to claim 28, wherein the communication station further comprises:
- spatial division multiple access (SDMA) processing facilities, responsive to the transceiver, to dynamically select a traditional communication channel and parse it into multiple SDMA channels employing adaptive antenna technology, wherein the transceiver places the emergency call on one or more of the SDMA channels to facilitate the emergency telephone call.

37. A wireless communication system according to claim 28, the communication station further comprising:
- reduced rate communication channels, reserved and dynamically assigned by the transceiver to facilitate emergency telephone calls.

38. An article of manufacture comprising:
- a machine accessible medium to provide instructions which, when executed by a subscriber unit, cause the subscriber unit to determine whether a communication channel is available at a servicing communication station to accommodate a telephone call upon detecting an off-hook signal from a telephone interface, provide the telephone interface with an indication denoting the unavailability of a communication channel if it is determined that the communication station does not have a communication channel available, to enable receipt of a digit of a telephone number from the telephone interface even if no communication channels are available and to compare the received digit, as received, against a corresponding digit of one or more emergency codes and, if the digits match, accept and compare a subsequent digit of the telephone number from the interface, as necessary, to determine whether a priority channel request is required to facilitate an emergency telephone call, and otherwise disabling the interface from accepting further digits if it is determined that the received digit is not associated with an emergency code.

39. An article of manufacture according to claim 38, further comprising instructions which, when executed, cause a subscriber unit to compare each digit of the received telephone number, as received, against one or more emergency codes maintained in the subscriber unit to determine whether the received digits correspond to one or more emergency services associated with the one or more emergency codes.

40. An article of manufacture according to claim 38, further comprising instructions which, when executed, cause the subscriber unit to issue a priority channel request upon detecting entry of an emergency code even if no communication channels are currently available.

41. An article of manufacture according to claim 40, wherein the priority channel request denotes a priority class of service that is greater than that of non-emergency telephone calls, such that the servicing communication station reallocates communication channel parameters to facilitate the priority channel request.

42. An article of manufacture according to claim 38, further comprising instructions which, when executed, cause a subscriber unit to facilitate an emergency telephone call through completion via a communication channel made available by the communication station in response to the subscriber unit's priority channel request.

43. An article of manufacture according to claim 38, further comprising instructions which, when executed, cause a subscriber unit to convert dual-tone, multiple frequency (DTMF) tones received from the telephone interface representing the telephone number entered by the user to digital signal(s), wherein said conversion is performed even if the subscriber unit receives an indication from the servicing communication station that all communication channels are currently unavailable until a digit is received that does not correspond to one or more emergency service code(s).

44. A wireless subscriber unit comprising:
   a telephone interface, to enable a user to enter a telephone number to place a telephone call; and
   a transceiver, coupled to the telephone interface, to accept entry of a digit of a telephone number from the interface even after determining that no communications channels are currently available from a servicing communication station, to compare the received digit, as received, against a corresponding digit of one or more emergency codes and, if the digits match, accept and compare a subsequent digit of the telephone number from the interface, as necessary, to determine whether a priority channel request is required to facilitate an emergency telephone call, and otherwise disabling the interface from accepting further digits if it is determined that the received digit is not associated with an emergency code.

45. A subscriber unit according to claim 44, further comprising:
   an off-hook signal generator, responsive to the telephone interface, to generate an off-hook signal to prompt the transceiver to request a communication channel from the communication station when the user lifts a handset of the telephone interface to place a call.

46. A subscriber unit according to claim 45, wherein the transceiver responds to the off-hook signal by requesting a communication channel and providing the telephone interface with an indication denoting whether a communication channel is available from the communication station.

47. A subscriber unit according to claim 46, wherein the transceiver provides one or more of a fast busy signal, a constant monotone signal, and/or any tone other than a dial tone as an indication to the user via the telephone interface that no communication channels are currently available to facilitate a telephone call.

48. A subscriber unit according to claim 44, further comprising:
   a dual-tone, multiple frequency (DTMF) converter to convert DTMF signals generated by the telephone interface representing the telephone number entered by the user in to digital signals appropriate for input to the transceiver.

49. A subscriber unit according to claim 48, wherein the DTMF converter remains enabled to receive and convert DTMF signals for the transceiver even if the transceiver determines that no communication channels are currently available until it is determined that a received digit does not correspond to an emergency services code.

50. A subscriber unit according to claim 49, wherein the transceiver receives and decodes the digital signals to determine whether the user is dialing an emergency number, even if there are no communication channels available to support the call.

51. A subscriber unit according to claim 50, further comprising:
   a memory device, to store one or more codes associated with an associated one or more emergency services, wherein the transceiver compares received digital signals associated with a user-entered telephone number against the stored one or more codes to determine whether the user is telephone number is associated with the one or more emergency services.

52. A subscriber unit according to claim 51, wherein the transceiver compares the digital signals associated with the user-entered telephone number on a digit-by-digit basis concurrently with receipt of the digits against corresponding digits of the one or more stored emergency codes, and disables receipt of further digits if the comparison reveals that a received digit does not conform to a corresponding digit of an emergency code(s).

53. A subscriber unit according to claim 44, the transceiver comprising:
   a memory, to receive and retain one or more codes associated with one or more emergency services; and
   a processor, coupled to the memory, to receive digital signals representative of the dialed telephone number and compare the received signals to the one or more codes stored in memory to detect telephone calls to the one or more emergency services.

54. A subscriber unit according to claim 44, wherein the priority channel is a reduced rate communication channel reserved for emergency telephone call, and wherein the transceiver includes reduced rate communication facilities.

55. A subscriber unit according to claim 44, wherein the priority channel is a spatial division multiple access (SDMA) enabled channel to facilitate an emergency telephone call.

56. A method comprising:
   receiving a priority channel request at a communication station from a wireless subscriber unit, the priority channel request denoting an emergency telephone call;
   determining whether a reserved, reduced rate communication channel is available to facilitate the emergency telephone call upon receipt of a priority channel request;
   establishing the emergency telephone call on the reserved, reduce rate communication channel to facilitate communication services through call completion if the reserved, reduce rate communication channel is available; and
   invoking spatial division multiple access (SDMA) processing to free communication channel resources to handle the emergency telephone call if a reserved, reduced rate communication channel is not available.

57. A communication station comprising:
   a plurality of wireless communication channels including full-rate communication channels and reserved, reduced-rate communication channels; and
   control logic, responsive to call requests received from subscriber units in a coverage area of the communication station, to select either a full-rate communication channel or a reserved, reduced rate communication channel to facilitate a communication session, wherein the control logic selectively employs a reserved, reduced rate communication channel to facilitate a telephone call associated with a priority channel request when no other communication channels are available, wherein the control logic employs spatial division multiple access (SDMA) processing techniques to free communication channel resources when neither a full-rate communication channel nor a reserved, reduced rate communication channel are otherwise available.

* * * * *